United States Patent
Endo et al.

(10) Patent No.: US 8,643,681 B2
(45) Date of Patent: *Feb. 4, 2014

(54) COLOR DISPLAY SYSTEM

(75) Inventors: Taro Endo, Chofu (JP); Fusao Ishii, Menlo Park, CA (US); Yoshihiro Maeda, Hachioji (JP); Hirotoshi Ichikawa, Hachioji (JP); Hirokazu Nishino, Akishima (JP)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 808 days.

This patent is subject to a terminal disclaimer.

(21) Appl. No.: 12/074,094

(22) Filed: Mar. 1, 2008

(65) Prior Publication Data

US 2008/0218537 A1    Sep. 11, 2008

Related U.S. Application Data

(60) Provisional application No. 60/904,564, filed on Mar. 2, 2007.

(51) Int. Cl.
G09G 5/10    (2006.01)

(52) U.S. Cl.
USPC ........... 345/690; 345/204; 345/691; 345/692; 345/694; 345/697

(58) Field of Classification Search
USPC ............................................ 345/102, 204, 87
See application file for complete search history.

(56) References Cited

U.S. PATENT DOCUMENTS

| | | | |
|---|---|---|---|
| 5,233,385 A | 8/1993 | Sampsell | |
| 5,448,314 A | 9/1995 | Heimbuch et al. | |
| 5,506,597 A | 4/1996 | Thompson et al. | |
| 5,589,852 A | 12/1996 | Thompson et al. | |
| 5,619,228 A * | 4/1997 | Doherty | 345/693 |
| 5,668,572 A | 9/1997 | Mayer et al. | |
| 5,767,828 A | 6/1998 | McKnight | |
| 5,903,323 A * | 5/1999 | Ernstoff et al. | 348/771 |
| 5,909,204 A | 6/1999 | Gale et al. | |
| 5,953,083 A | 9/1999 | Sharp | |
| 6,256,425 B1 | 7/2001 | Kunzman | |
| 6,464,633 B1 * | 10/2002 | Hosoda et al. | 600/178 |
| 6,520,648 B2 | 2/2003 | Stark et al. | |
| 6,621,529 B2 | 9/2003 | Ohara et al. | |
| 6,828,961 B2 | 12/2004 | Elliott et al. | |
| 6,952,241 B2 * | 10/2005 | Ouchi et al. | 348/742 |
| 6,970,148 B2 | 11/2005 | Itoh et al. | |
| 6,972,736 B1 | 12/2005 | Wada et al. | |
| 6,972,771 B2 * | 12/2005 | Nakano et al. | 345/589 |
| 7,052,138 B2 * | 5/2006 | Matsui | 353/31 |
| 7,224,328 B2 | 5/2007 | Wada et al. | |

(Continued)

Primary Examiner — Grant Sitta
(74) Attorney, Agent, or Firm — Bo-In Lin

(57) ABSTRACT

A color display device including: at least one spatial light modulation element forming a display picture by modulated light obtained by modulating illumination light, a color sequential light generation device changing in a time series the illumination light or the modulated light into multiple groups of different color lights in one frame of a display period of the display picture, a control device controlling the spatial light modulator, and a color sequential light generation device based on the input picture data. The control device controls the spatial light modulator and the color sequential light generation device to change the ratio of the display time of each color of the reflected light time-shared in the display period of the frame depending on the character and/or the set value of the input picture data.

16 Claims, 10 Drawing Sheets

(56) References Cited

U.S. PATENT DOCUMENTS

| | | |
|---|---|---|
| 7,295,173 B2 | 11/2007 | Itoh et al. |
| 7,408,527 B2 * | 8/2008 | Slobodin ............ 345/32 |
| 7,586,475 B2 * | 9/2009 | Lee et al. ............ 345/98 |
| 2003/0142275 A1 | 7/2003 | Yoshida |
| 2004/0008288 A1 * | 1/2004 | Pate et al. ............ 348/742 |
| 2004/0263430 A1 | 12/2004 | Richards et al. |
| 2005/0212729 A1 * | 9/2005 | Chung et al. ............ 345/76 |
| 2005/0243100 A1 | 11/2005 | Childers |
| 2005/0254116 A1 * | 11/2005 | Ishii ............ 359/291 |
| 2006/0119712 A1 * | 6/2006 | Yamamoto et al. ......... 348/229.1 |
| 2006/0158566 A1 * | 7/2006 | Sugiyama ............ 348/656 |
| 2006/0245017 A1 | 11/2006 | Aoki et al. |
| 2006/0268002 A1 * | 11/2006 | Hewlett et al. ............ 345/600 |
| 2007/0040998 A1 | 2/2007 | Yamazaki et al. |
| 2007/0120786 A1 | 5/2007 | Bellls et al. |
| 2008/0084369 A1 | 4/2008 | Dickinson |

* cited by examiner

COLOR DISPLAY SYSTEM

This application is a Non-provisional application claiming a Priority date of Mar. 2, 2007 based on a previously filed Provisional Application 60/904,564 filed by the common Applicants of this Application and the disclosures made in Provisional Application 60/904,564 are further incorporated by reference.

BACKGROUND-FIELD OF INVENTION

The present invention relates to a color display apparatuses. More particularly, this invention relates to color image display systems implemented with an effective color display technique for controlling display light for each color of the primary colors.

BACKGROUND-PRIOR ART

Color image display systems are known and commonly implemented with color displays using three primary colors of red, green and blue. However, such display systems still have limitations for further improvement of display qualities as will be further discussed below.

U.S. Pat. No. 5,448,314 discloses a technique for displaying a color image by projecting the display light of R/G/B (red/green/blue) on an image display surface such as an image display screen. The display light of three colors is generated from the light reflected from a spatial light modulator (SLM) implemented as a deformable mirror device (DMD). The reflected light then project to pass through a color separation device such as a color wheel for projecting time-sequential display light of R/G/B (red/green/blue).

FIG. 1 shows a method of driving a mirror element by applying a pulse width modulation method to control each mirror element for projecting a pixel of the DMD. The pulse width modulation (PWM) control method is applied for switching ON (display)/OFF (no display) of a mirror element depending on the pulse width of the input digital video data for one color frame corresponding to a brightness of each color. An observer visually perceives pixels displayed in different color of R/G/B. As these color pixels are displayed sequentially in each display frame. Perceivers' eyes integrate these sequential color pixels into human-eye recognizable color images when each frame is displayed with a frequency higher than a designated frequency. With a color wheel or other color sequential separation devices such as a color wheel carries out a sequential color separation for an image display system, the display time of each color of R, G, and B in the display region of one frame of a display picture is normally divided into three fixed equal sections. Therefore, the display time of each color is uniform and constant. It is difficult to improve the brightness corresponding to the picture data. For example, the display time of R is equal to the display times of other G (green) and B (blue) even though the brightness red color component is absolutely dominant based on the picture data while the lengths of the display time for the green and blue colors are significantly less. Therefore, the brightness is limited by projecting a red pixel in a sub-frame by dividing one frame of display period assigned to R into three equal sections even other two colors are turned off in most of the time periods in other two equally divide sub-frames.

In order to resolve such limitations, U.S. Pat. No. 5,668,572, discloses an attempt of improvement of the balance of each of R, G, and B by changing the division domain (central angle of a shape of a sector) of a filter of each color in a color wheel. In another U.S. Pat. No. 5,233,385, another attempt of improvement of the brightness of a display picture is disclosed by arranging a white filter (white segment (W)) in addition to the filter of three colors of R, G, and B. However, in U.S. Pat. No. 5,668,572 and U.S. Pat. No. 5,233,385, the ratio of each color of R, G, and B or R, G, B, and W is still kept as fixed values. The control of the brightness of each color is still limited due to the limitation that the brightness control cannot be directly corresponding to the characteristic of the color combination of input picture data. The quality of the image display is degraded due to the limitation that a dynamic brightness control of each color cannot be performed.

Furthermore, the limitation of not able to flexibly control the brightness of each color in each display frame further limits the resolution of the gray-scale levels

SUMMARY OF THE INVENTION

The present invention discloses a color display technique for improving the color balance and brightness of a display picture by applying a dynamic color brightness control corresponding to the characteristics of the input picture data related to the relative brightness of each color.

Another advantage of the color image display system disclosed by the present invention is the implementation of a color display technique for increasing the displayed gray-scale level of each color depending on the characteristics of the input picture data.

The first aspect according to the present invention is a color display device including:

an illumination device comprising a plurality of laser light sources or light emitting diode (LED) for generating an illumination light of a plurality of different colors;

at least one spatial light modulator forming a display image by a modulated light obtained by modulating an illumination light; and a control device controlling the spatial light modulator and the illumination device based on an input image data, wherein the control device controls the spatial light modulator and the illumination device to change a ratio of a display time of each color of the illumination light time-shared in the frame period depending on a characteristic and/or a set value of the input image data, and controls the illumination device to change intensity of light of at least one color of the plurality of illumination light.

The second aspect according to the present invention is based on the color display device of the first aspect. In the color display device, the control device dynamically changes the ratio of the display time and/or the intensity of light of the illumination light in a plurality of consecutive frames.

The third aspect according to the present invention is based on the color display device of the first aspect. In the color display device, a cycle of the frame period is between 50 Hz and 360 Hz.

The fourth aspect according to the present invention is based on the color display device of the first aspect. In the color display device, the control device controls the illumination device to change a modulation of at least one color of the illumination light generated from the plurality of light sources.

The fifth aspect according to the present invention is based on the color display device of the fourth aspect. In the color display device, the modulation is an intensity modulation of light of the light source.

The sixth aspect according to the present invention is based on the color display device of the fourth aspect. In the color display device, the modulation is a cyclic modulation of a pulse emission of the light source.

The seventh aspect according to the present invention is based on the color display device of the fourth aspect. In the color display device, the modulation is a pulse width modulation of a pulse emission of the light source.

The eighth aspect according to the present invention is based on the color display device of the first aspect. In the color display device, the control device controls the spatial light modulator and the illumination device to increase a number of gray-scale levels of brightness of a color for which a ratio of the display time is increased.

The ninth aspect according to the present invention is based on the color display device of the eighth aspect. In the color display device, the control device controls the illumination device to increase intensity of the illumination light of a color different from the color for which the ratio of the display time is increased.

The tenth aspect according to the present invention is based on the color display device of the eighth aspect. In the color display device, the control device controls the illumination device to decrease intensity of the illumination light of the color for which the ratio of the display time is increased.

The eleventh aspect according to the present invention is based on the color display device of the eighth aspect. In the color display device, the number of gray-scale levels of brightness is 768 or more.

The twelfth aspect according to the present invention is based on the color display device of the first aspect. In the color display device, the characteristic of the image data is an average value of brightness of each color included in each piece of pixel data configuring the image data of one image frame.

The thirteenth aspect according to the present invention is based on the color display device of the first aspect. In the color display device, the each piece of pixel data is included in a data of at least one pixel positioned in substantially central portion of a screen reproduced by the input image data.

The fourteenth aspect according to the present invention is based on the color display device of the first aspect. In the color display device, the characteristic of the image data is an average value of brightness of each color included in each piece of pixel data configuring the image data of consecutive image frames.

The fifteenth aspect according to the present invention is based on the color display device of the first aspect. In the color display device, the each piece of pixel data is included in a data of at least one pixel positioned in substantially central portion of a screen reproduced by the input image data.

The sixteenth aspect according to present invention is based on the color display device of the first aspect. In the color display device, the control device controls the spatial light modulator and the illumination device to adjusting the ratio of the display time of a color depending on a spectral luminous efficiency of man.

The seventeenth aspect according to the present invention is based on the color display device of the first aspect. In the color display device, further comprises a communication device, and can change the ratio of the display time of each colors according to an information externally received from the communication device.

The eighteenth aspect according to the present invention is based on the color display device of the first aspect. In the color display device, the spatial light modulator comprising a plurality of micromirrors, and is controlled to modulating states of an ON state, an OFF state and an oscillation state corresponding to an control signal generated by the control device.

The nineteenth aspect according to the present invention is based on the color display device of the eighteenth aspect. In the color display device, the control device comprises a data conversion device converting a part or all of the image data into non-binary data, and generates a modulation control signal of the micromirrors depending on the non-binary data, and controls the spatial light modulator.

The twentieth aspect according to the present invention is based on the color display device of the eighteenth aspect. In the color display device, the control device generates the modulation control signal to change a combination of the ON state, the OFF state and the oscillation state depending on the ratio of a display time of each color in the frame period, so as to increase a number of gray levels of an image formed by the spatial light modulator.

BRIEF DESCRIPTIONS OF THE DRAWINGS

DESCRIPTION OF THE PREFERRED EMBODIMENTS

The embodiments of the present invention are described in details below with reference to the drawings.

Figure 1:
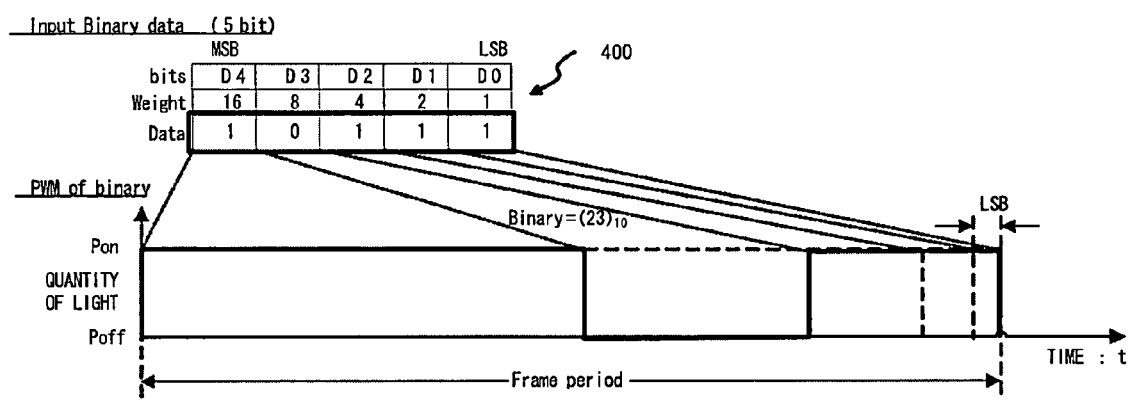
FIG. 1 is a diagram showing a related art of switching ON (display)/OFF (no display) of a mirror element by the pulse width modulation by binary data.
Figure 2:
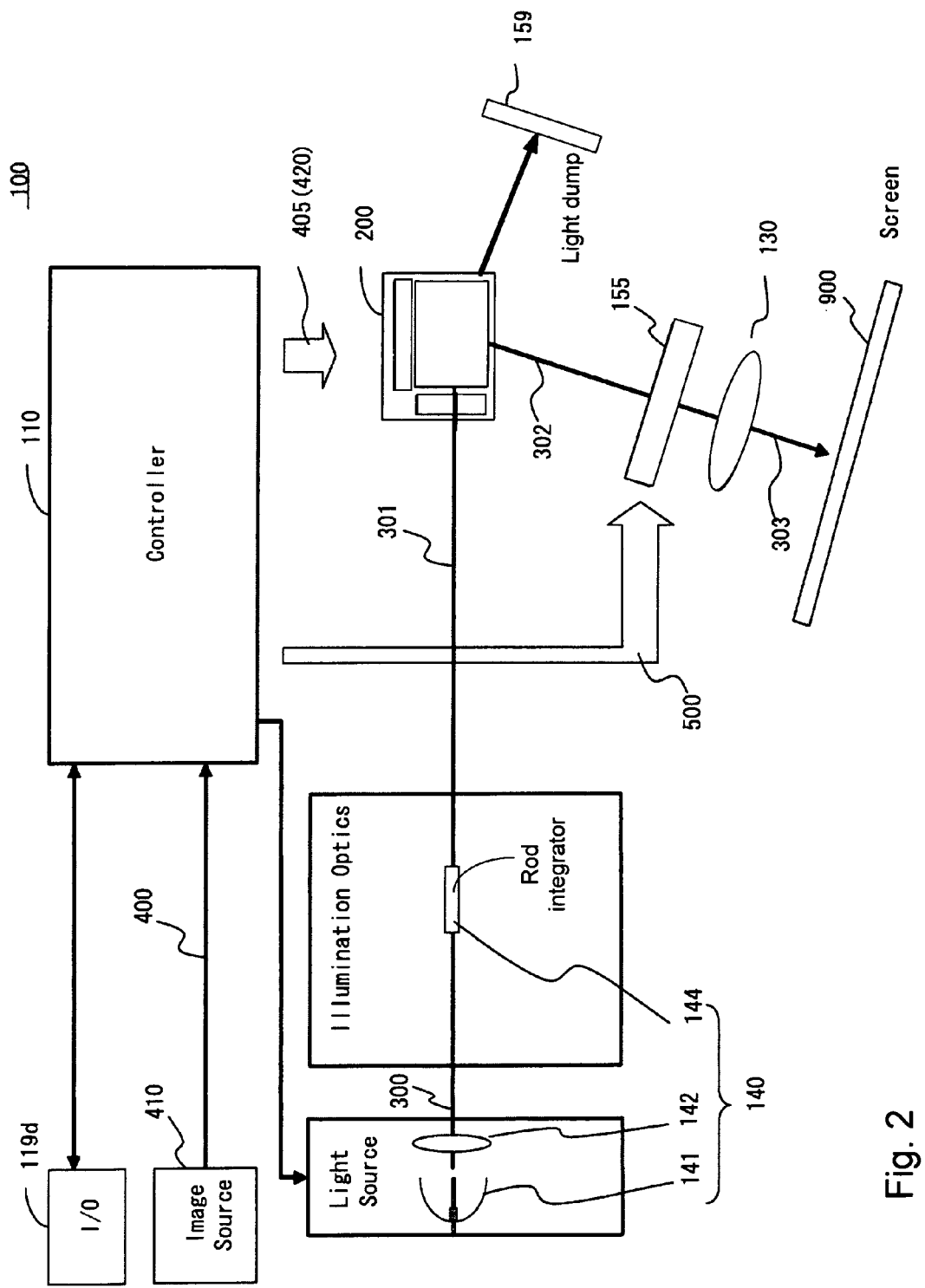
FIG. 2 shows the concept of the configuration of the color display device according to an embodiment of the present invention.
Figure 3:
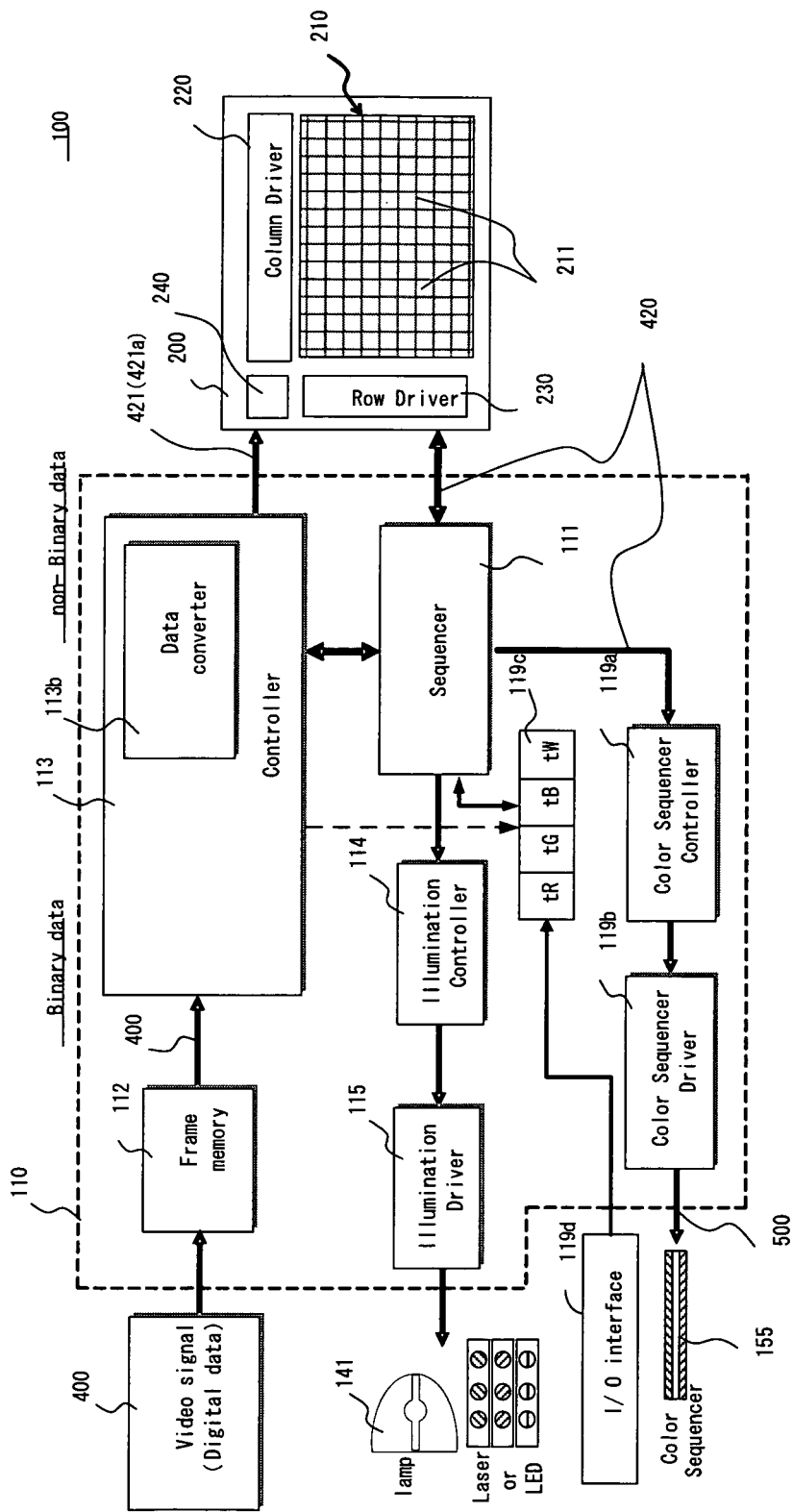
FIG. 3 is a block diagram showing an example of the configuration of a control system of a projection display device according to an embodiment of the present invention.
Figure 4:
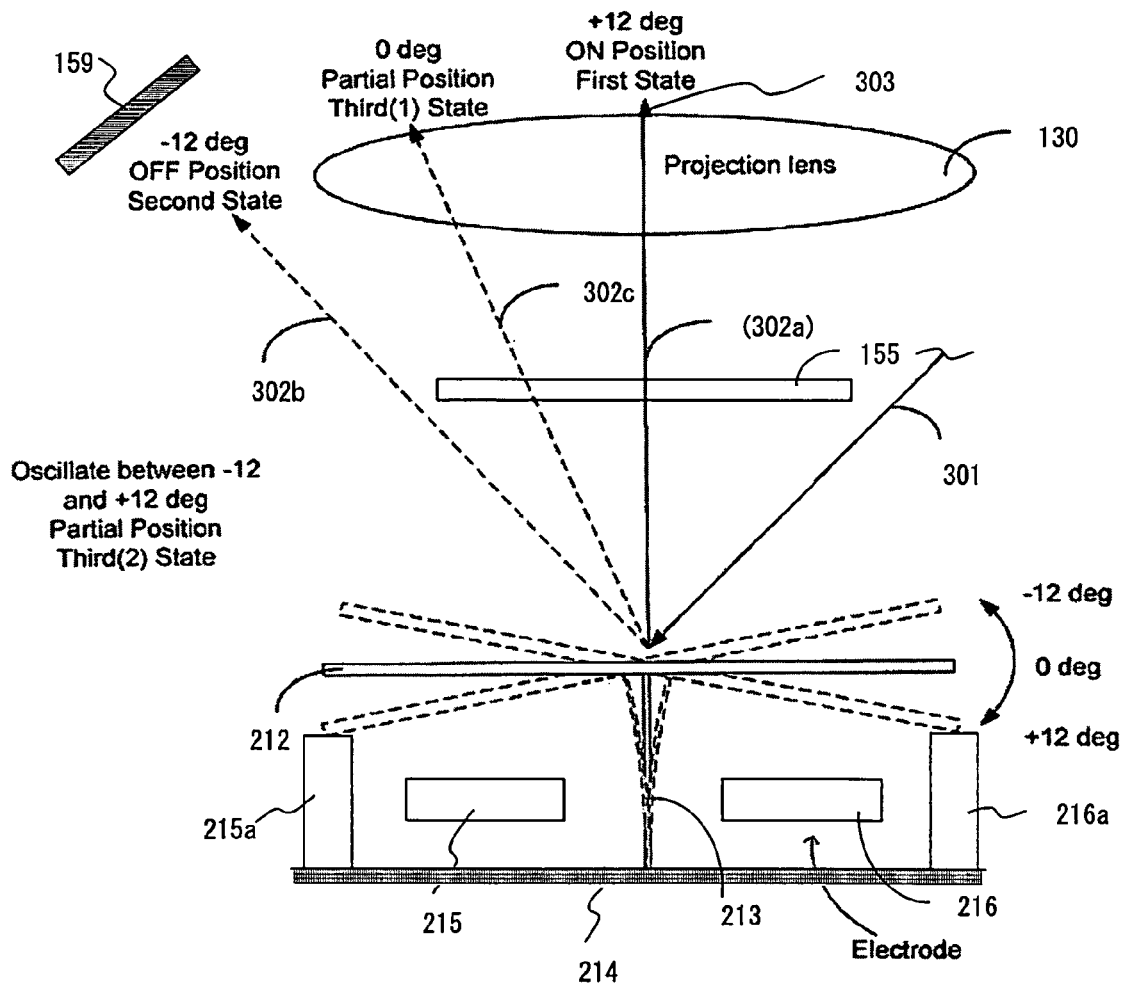
FIG. 4 shows the concept of an example of the configuration of each pixel unit of a spatial light modulation element configuring a projection display device according to an embodiment of the present invention.
Figure 5:
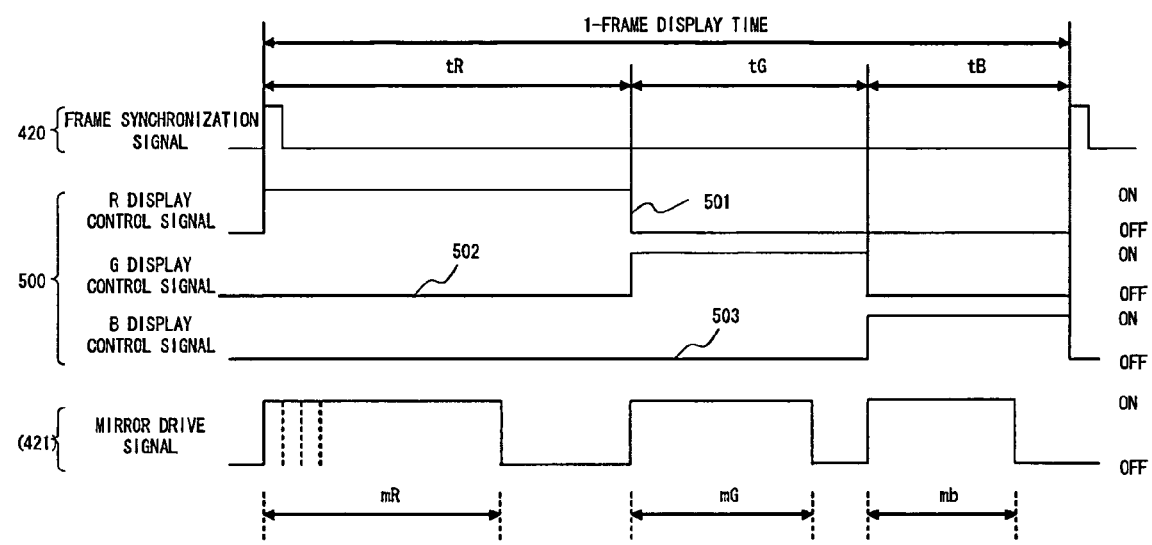
FIG. 5 is a diagram showing an example of the operation of the color display device according to an embodiment of the present invention.
Figure 6:
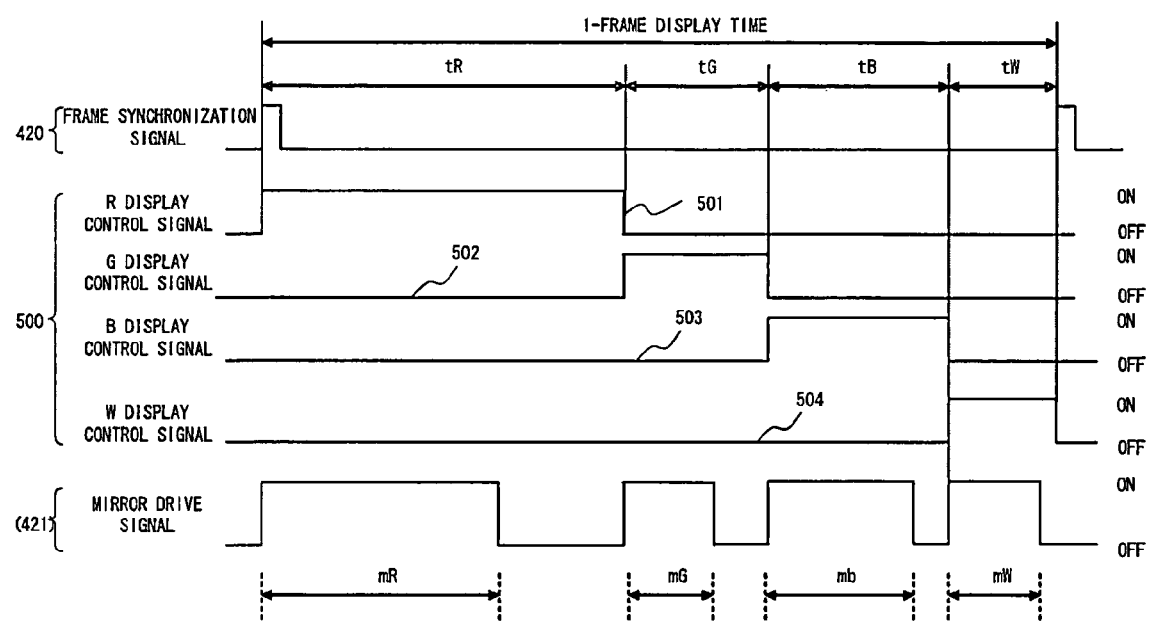
FIG. 6 is a diagram, showing an example of the operation of the color display device according to an embodiment of the present invention.
Figure 7:
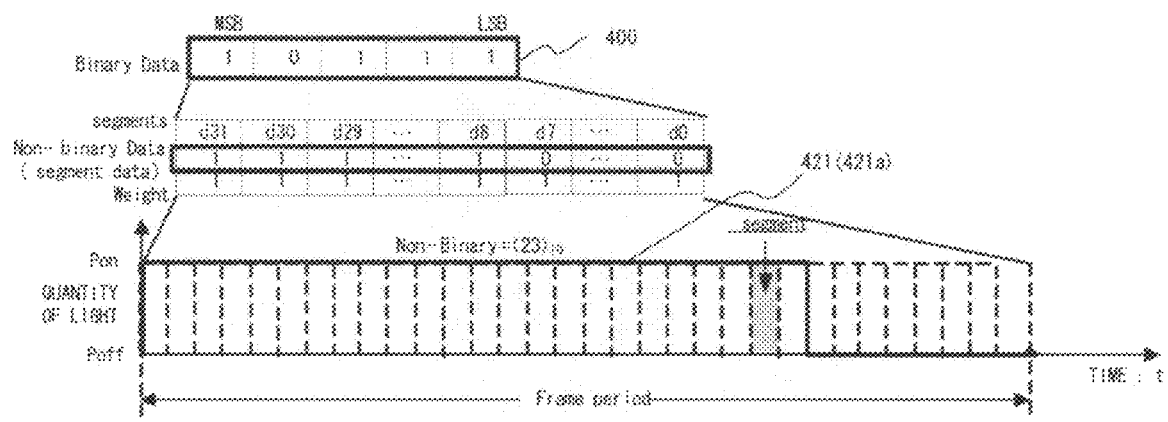
FIG. 7 is a diagram showing an example of the operation of the color display device according to an embodiment of the present invention.

FIG. 2 is a functional block diagram for showing the configuration of the color display device for carry out the color display methods according to embodiments of the present invention. FIG. 3 is a block diagram for showing an exemplary configuration of a control system of a projection display device of the present invention. FIG. 4 is a cross sectional view of a mirror element for showing an exemplary configuration of each pixel unit of a spatial light modulation element configuring a projection display device as an embodiment of the present invention. FIGS. 5, 6, and 7 are timing diagrams for showing exemplary operation sequences of the color display device according to an embodiment of the present invention.

FIG. 2 shows a color display device 100 includes a spatial light modulator 200, a control unit 110, a projective optical system 130, and a light source optical system 140. The light source optical system 140 includes a light source 141 for generating an illumination light 300 for projecting to a condensing lens 142 for condensing the illumination light 300 and then to a rod type condenser 144. The light source 141, the condensing lens 142, and the rod type condenser 144 are sequentially arranged along the optical axis of the illumination light 300 to project as the incoming light 301 output from the light source 141 and input to the spatial light modulator (SLM) 200. The modulation of the spatial light modulator 200 reflects the incoming light 301. A color sequential light generation device 155 and the projective optical system 130 are arranged along the optical path the reflected light 302.

The projective optical system 130 projects the reflected light 302 received from the color sequential light generation device 155, and the spatial light modulator 200 spatially modulates a color switching process after the reflected light. and the projective optical system 130 then project the image light 303 on a screen 900.

The color sequential light generation device 155 includes a deformable switch for selectively switching the deformable state of a plurality of wavelength regions (colors) of the reflected light 302 with flexible timing by electric control (not shown-). A dynamic color filter device arranged at a later stage and configured with a plurality of deforming plates to pass only the colors of R, G, and B in a specific deformable state.

Thus, the color sequential light generation device 155 functions as a dynamic color filter that is controllable for selectively switching the colors, such as colors include R, G, and B and white, black, cyan, and magenta, to transmit different colors of the reflected light 302 to pass through the color sequential light generation device 155. An external signal 500 as further described below is inputted to control the color sequential light generation device to control the device at a high speed with flexible timing control thus achieve dynamic color control to generate higher quality of image display.

FIG. 3 shows the control unit 110 that includes a sequencer 111, a frame memory 112, a controller 113, a light source control unit 114, a light source drive circuit 115, a control device 119a of a dynamic color filter device, and a drive circuit 119b of a dynamic color filter device. The sequencer 111 may be implemented as a microprocessor or electronic devices for performing similar functions and controls the entire operation timing and related processes of operation of the control unit 110. The timing and operational states of the light source control unit 114, the control device 119a of a dynamic color filter device, and the spatial light modulator 200 can therefore properly synchronized and coordinated to produce image projection light with improved display quality. As shown in FIG. 3, the sequencer 111 applies a control frame synchronization signal 420 to control and synchronize the operation of the spatial light modulator 200 and the color sequential light generation device 155. The frame memory 112 holds a plurality of frames of input digital video data 400 received from external equipment, such as a picture data source 410. The input digital video data 400 is continuously and periodically updated after a predetermined number of frames are projected. The controller 113 analyzes the input digital video signal 400 read from the frame memory 112 to determine the relative brightness of the each color, and generates the signal to control the spatial light modulator 200. The controller 113 further analyzes the total amount of each primary colors in a single frame or a plurality of frames and determines the ratio of the total amount between the primary colors, and stores the ratio data to the color switch timing setting memory 119c. The controller determines the total amount based on the average brightness or the maximum brightness or the minimum brightness of the primary colors according to the data received for each image pixel. The controller 113 also analyzes the variation of the brightness of each primary color of pixels contained in successive frames and determines the primary color of most significant variation or of less significant variation, and then modifies the above mentioned ratio data based on the variation data. The controller 113 may flexibly perform the above-mentioned analyses on selective image display areas, such as the central portion, of the images based on the changeable external setting. The controller 113 implements a data conversion circuit 113b to process the input digital video data 400 read from the frame memory 112, and outputs the data as a mirror drive signal 421a of non-binary data 421 to the spatial light modulator 200. The data conversion circuit 113b converts the input digital video data 400 to the non-binary data 421 (mirror drive signal 421a. FIG. 7 shows an exemplary embodiment with each piece of data having equal weight as a bit string including the number of serial bits of "1" corresponding to the brightness value.

The light source control unit 114 implements the light source drive circuit 115 that receives' instructions from the sequencer 111 to control the operation of the light source to emit illumination light 300 at the 141. The control device 119a of the color sequential light generation device implements the drive circuit 119b of the color sequential light generation device to control the color sequential light generation device 155.

Practically, as the sequencer 111 inputs the frame synchronization signal 420, the color or the reflected light 302 passing through the color sequential light generation device 155 is changed into red (R), green (G), blue (B), and white (W) sequentially according to flexibly controllable time width based the optical time sharing control signal 500 to the color sequential light generation device 155. Thus, the control signal 500 includes an R display period control signal 501, a G display period control signal 502, a B display period control signal 503, and a W display period control signal 504. The control signal 500 is inputted to the color sequential light generation device 155 for control of the timing of changing each of red (R), green (G), blue (B), and white (W).

In the present exemplary embodiment, the control unit 110 further includes a color switch timing setting memory 119c. The sequencer 111 controls the display period of each color of R, G, B, and W in one frame depending on the data stored in the color switch timing setting memory 119c. The color switch timing setting memory 119c stores data of at least one of a red display period tR, a green display period tG, a blue display period tB, and a white display period tW. The data can be externally set to any value through, for example, a communication interface 119d.

The method of determining the set ratio of the red display period tR, the green display period tG, the blue display period tB, and the white display period tW can be flexibly implemented. For example, the method may adjust the ratio of the display period of each color depending on the spectral luminous efficiency of the eyes of a person who visually recognizes a display picture, or the method may depend on the user setting of the color balance.

The same advantages of applying the dynamic color filter device can be achieved by the sequencer 111 by controlling the light source control unit 114 in such a way that the emitting period of each color of R, G, and B controllable in one frame. The light source may be controlled depending on the set contents of the color switch timing setting memory 119c using as the light source 141 a laser light source or a LED light source for emitting a pencil of light of red (R), blue (B), and green (G). Such advantages can be achieved without a dynamic color filter device as the color sequential light generation device 155. Combination of R, G and B color lights of the laser light sources or an LED light sources generates white illumination light. Also illumination light of Cyan (C), Magenta (M), and Yellow (Y) as secondary color are achieved by combining R, G and B as primary color lights of the laser light sources or the LED light sources. Light quantity control and modulation control may be conveniently carried out by implementing a laser light source or an LED light source because a voltage lower than that for the conventional discharge lamp light source may be applied to perform momentary emission.

By adjusting the control signal from the light source control unit 114, the number of gray-scale levels of display pictures can be increased by performing the light quantity control of a light source together with the time-sharing control of the light of a light source. In addition, adjusting the control signal from the light source control unit 114 may increase the gray-scale levels of display pictures. The pulse and the period and the time width of the pulse are modulated together to drive light source. is driven by With the flexibilities of the time-sharing control of the light of a light source by performing the modulation control of the period of the pulse emission and the width of an emission time the gray levels of the display images can be further increased.

The method of increasing the gray levels of a particular color by intensity modulation of the light source is further described below. In order to achieve an image display with a predefined gray level resolution, the controller 113 determines the display period ratio from the image display data of each color. The display period is increased for the color that requires more gray levels, and the display period is decreased for the other color that requires less gray levels. The ratio data is stored in the color switch timing setting memory 119c. The controller 113 further determines the intensity data of each color. The intensity of the first color is decreased depending on the increase of the display period of the first color and the intensity of the second color is increased according to the depending on the display period of the second color. The data of the relative light intensities are stored in the color switch timing setting memory 119c. The sequencer 111 controls the light source control unit 114 based on the display period setting and the intensity setting of each color. The light source control unit 114 controls the output signal of the light source drive circuit 115 so that each light source emits the predetermined amount of flux during the predetermined period of time as discussed above. Thus it is possible to increase the gray level resolution of the first color and reduce the gray level of the second color while maintaining the brightness and the color balance of the displayed image.

As shown in FIG. 3, the spatial light modulator 200 according to the present embodiment includes a pixel array 210, a column driver 220, a row driver 230, and an external interface 240. The pixel array 210 includes a plurality of pixel units 211 in a grid formation arranged in the position in which a bit line (not shown) extends in a vertical direction from the column driver 220 crosses a word line (not shown) extending in the horizontal direction from the row driver 230.

As illustrated in FIG. 4, each pixel unit 211 includes a mirror 212 supported by a hinge 213 disposed on a substrate 214 to flexible tilt to different angular positions. An OFF electrode 215 and an OFF stopper 215a are symmetrical disposed the substrate 214, with an ON electrode 216 and an ON stopper 216a symmetrical with reference to the hinge 213.

By applying a predetermined voltage to OFF electrode 215, a Coulomb force pulls the mirror 212 tilts the mirror until it touches the OFF stopper 215a. Thus, incoming light 311 projected to the mirror 212 is reflected as the reflected light 302 toward the optical path 302b of the OFF position to deviate from the optical axis of the projective optical system 130, and is absorbed by an optical absorber 159. By applying predetermined voltage to the ON electrode 216, a Coulomb force pulls the mirror 212 and tilts the mirror until it touches the ON stopper 216a. Thus, the incoming light 311 projected to the mirror 212 is reflected as the reflected light 302 toward the optical path 302a of the ON position matching on the optical axis of the color sequential light generation device 155 and the projective optical system 130. The ON/OFF control of the mirror 212 is performed by the mirror drive signal 421a of the non-binary data 421.

By receiving and applying the mirror drive signal 421a, the spatial light modulator 200 drives the OFF electrode 215 and the ON electrode 216, thereby oscillating the mirror 212 in the position between the ON position and the OFF position. Thus, the reflected light 302 is projected along an optical path 302c between the optical path 302a and the optical path 302b to the color sequential light generation device 155 and the projective optical system 130, to achieve a gray-scale at a brightness level lower than the simple dual-state ON/OFF control.

FIG. 5 is a timing diagram for showing an exemplary relationship among the frame synchronization signal 420, the control signal 500, and the non-binary data 421 (mirror drive signal 421a). Each frame period is divided into red, blue and green sub frame period, and in each sub frame period, the mirror 212 of the spatial light modulator 200 is controlled to have an ON/OFF modulation period and an oscillation modulation period determined by the above mentioned non binary data.

The operation of the color display device 100 according to an embodiment of the present invention is described below. The data conversion circuit 113b of the controller 113 converts input digital video data 400 received from the picture data source 410 in the control unit 110 into the non-binary data 421 (mirror drive signal 421a) for each color. The sequencer 111 generates the frame synchronization signal 420 based on the set values of the red display period tR, the green display period tG, the blue display period tB, and the white display period tW set in the input digital video data 400 and also the color switch timing setting memory 119c.

In synchronization with the frame synchronization signal 420, the non-binary data 421 of each color is sequentially outputted to the spatial light modulator 200 to carry out the ON/OFF control of the mirror 212 of each pixel unit 211 in synchronization with the frame synchronization signal 420. The frame synchronization signal 420 is simultaneous outputted to the control device 119a of the color sequential light generation device to generate the R display period control signal 501, the G display period control signal 502, the B display period control signal 503, and the W display period control signal 504. These color control signals are outputted as the control signal 500 to the color sequential light generation device 155 to project through the drive circuit 119b for generating the color sequential light to project on the display screen 900.

Figure 8:
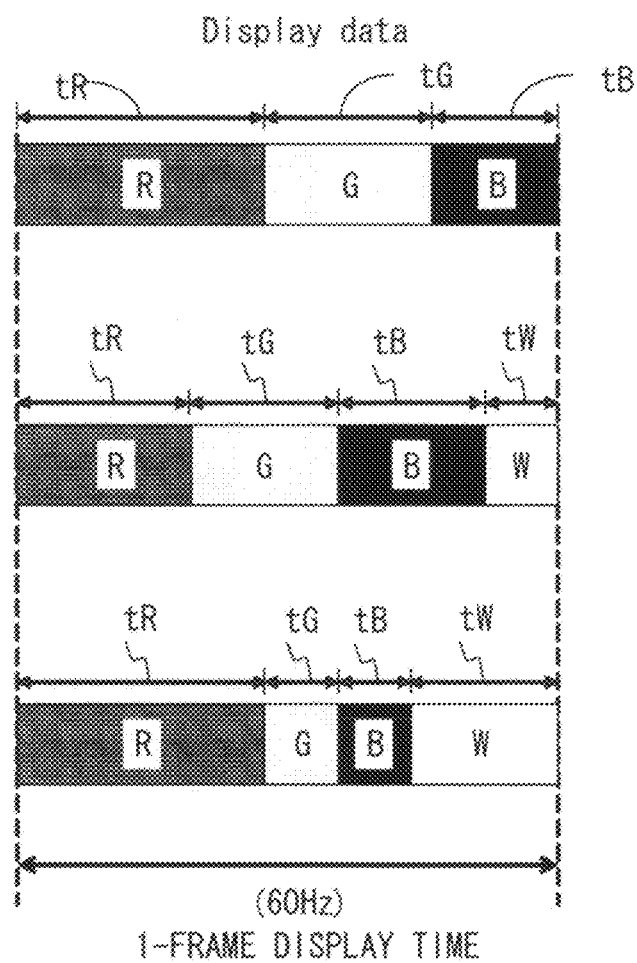
FIG. 8 is a diagram showing an example of the operation of the color display device according to an embodiment of the present invention.

FIG. 8 is a diagram for illustrating the synchronization of signal 420 for synchronizing each display period of R, G, B, and W in 1-frame period having a frequency about 60 Hz. The frame synchronization signal 420 is variably set depending on the set value of the red display period tR, the green display period tG, the blue display period tB, and the white display period tW. The one frame period is not limited to 50 Hz or 60 Hz of the general television signal standard. The frame period can be flexibly set at multiplied frequencies to be compatible with different existing display systems. In recent years, as the information processing techniques are developed, displays with higher frame rates, in order to increase the quality of the movie display, are a common practice. Display systems with 120 Hz, 240 Hz or 360 Hz have been realized. The present invention can be applied to those display systems as well.

The upper column shown in FIG. 8 shows an example of flexibly changing the combination of the ratio of the display period of R, G, and B in a 1-frame display period. The corresponding timing chart in this case is shown in FIG. 5. According to FIG. 8, an exemplary functional relationship among the red display period tR, the green display period tG, and the blue display period tB based on the image data is shown.

The intermediate and lower columns in FIG. 8 show the display period of W in addition to those of R, G, and B, and the combination of the ratio of the display periods of R, G, B, and W is flexibly changed in a 1-frame display period. The corresponding timing chart of this case is shown in FIG. 6.

In each period of the red display period tR, the green display period tG, the blue display period tB, and the white display period tW including R, G, and B colors are assigned in a time series. Depending on the brightness of each color, the mirror ON period mR, the mirror ON period mG, the mirror ON period mB, and the mirror ON period mW are changed for controlling the brightness of each color. The level of the red brightness value iR, the green brightness value iGl the blue brightness value iB, and the white brightness value iW in one frame of each color are applied to determine mirror ON period mR, the mirror ON period mG, and the mirror ON period mB. Consequently, a color assigned with a longer display period in one frame is brighter. In the present exemplary embodiment, one spatial light modulator 200 as described above to display color images. Therefore, the reflected light 302 as the light of R/G/B (red/green/blue) is generated in a time sequential manner. The reflected light 302 is modulated by the spatial light modulator 200 after receiving the illumination light 300 projected as the incoming light 301 from the light source 141. The modulated light then passes through the projective optical system 130 to project on the screen 900 based on the non-binary data 421. Human eyes perceive the color image projected on the screen 900 that visually integrating different colors projected as color pixels as of R/G/B color pixels.

The color display device 100 according to the present embodiment has the following effect:
(1) The color display device 100 according to the exemplary embodiments can improve the brightness by carrying out dynamic color display control based on the picture data (input digital video data 400). Specifically, according to the present embodiment, the brightness of a display image is improved because the display time of a less frequently used color in the picture data (input digital video data 400) is decreased, and the display time of a frequently used color is increased.

Figure 9:
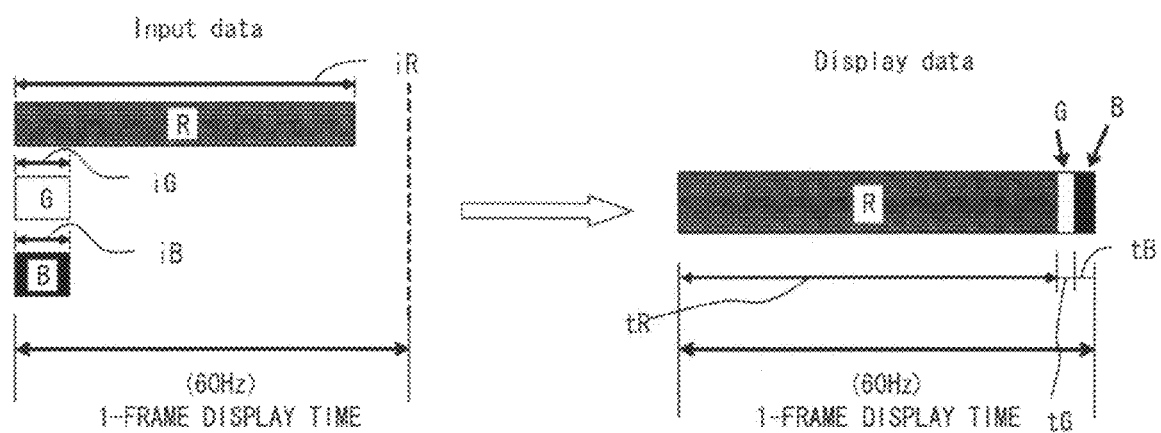
FIG. 9 is a diagram showing an example of the operation of the color display device according to an embodiment of the present invention.

For example, in a case of using a color wheel for separating the RGB colors, when a picture has a predominance color of red, the display time of the red color is about ⅓ of one picture frame time in the conventional display system. However, in this same scenario, according to the present embodiment of the invention as illustrated in FIG. 9, when the red brightness value iR is higher and dominant over the green brightness value iG and the blue brightness value iB in the input digital video data 400 in the color display device 100, the display time (red display period tR) of the dominant red can be projected to substantially fill in one picture frame time. Thus, the brightness of the projected image can be improved as much as three times as compared with the conventional display system. This technology has many practical implications. For example, in a picture display of a scene of the sea on a clear day in which the picture is mainly blue or in a scene of a sunset mainly in red, a dynamic range of the brightness of a dominant color in a picture can be expanded by setting the blue display period tB or the red display period tR relatively longer than the display periods of the other colors. The controller 113 analyzes the color data of the input digital video data 400 and sets the ratio so that the color with higher intensity and with a smaller intensity are dynamically controlled and adjusted.

In the scenario when a particular moving body occupies the majority of the frames, it is possible to display the motion of the body more clearly by setting the longer display period for the color representing the moving body, with large variation. It is preferable to apply the dynamic color control analysis to the central portion of the pixels because an observer usually views the central portions with more attention in viewing the display images included in a TV or movie programs.

(2) The color display device 100 disclosed in this invention is provided to project color images with increased resolution of gray-scale and higher brightness.

Specifically, as discuss in (1) above, a higher resolution of gray level scale is achieved by dynamically controlling the ratio of the display time in one picture frame. The display time is increased by controlling the mirror ON period for each color, namely, mR for mirror ON period for red light, mG, mirror ON period for green light and mB for mirror ON time for blue light, and mirror ON period mW. The display gray-scale levels can be increased with increased brightness of image display. The gray-scale of the brightness is decreased for a color with a decreased display time.

Figure 10A:
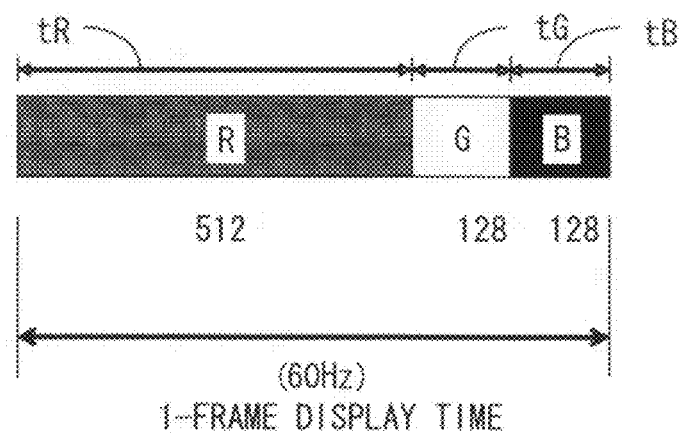
FIG. 10A shows the concept of an example of a setting when a different number of gray-scale levels is set for each color in the color display device according to an embodiment of the present invention.
Figure 10B:
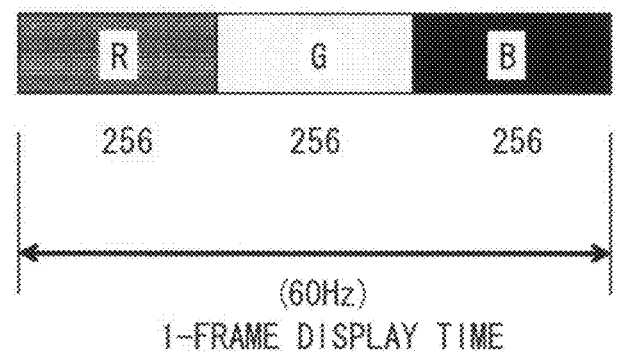
FIG. 10B shows the concept of a setting status of the number of grayscale levels of each color of R, G, and B in the display system according to a related art.

FIG. 10A is a diagram that shows an example display time allocations according to the display data of each of the RGB as non-binary data. The display data is applied for controlling to assigning a larger number of display gray-scale levels to a color having a longer display time. In contrast, the conventional basic display system assigned a weight depending on the binary bit data using the color wheel shown in FIG. 10B and each of the colors RGB is displayed and fixed in 8 bits (256 gray-scale levels) time allocation scheme with no flexibility to adjust the brightness and gray scales dynamically.

FIG. 10A shows the embodiment of the present invention there are 512 gray-scale levels (9 bits) assigned to the dominantly set red display period tR that is four times more than the gray-scale levels (128 gray-scale levels (7 bits)) of other green display period tG and blue display period tB. The red color of image display therefore has a larger number of gray-scale levels.

Recently, display images are represented in improved gray-scale. For example, in each color of R, G, and B to be displayed, it is proposed that the brightness of a specific color is displayed in 512 gray-scale levels (9 bits), and the other two colors are displayed in 256 gray-scale levels (8 bits). For such display systems, according to the present invention, a larger number of gray-scale levels can be assigned to the dominantly set red display period tR by assigning 768 gray-scale levels. The gray scales for the red display color is six times larger than the gray-scale levels (128 gray-scale levels (7 bits)) of the green display period tG and the blue display period tB.

FIG. 4 shows a micromirror device provided to display images with higher levels of gray scales than the conventional ON/OFF modulation. Combination of the ON, OFF and oscillation modulations are carried out to achieve the higher levels of gray scales in the image display. With an oscillation modulation representing a quarter of the brightness of ON modulation, two bits of additional resolution of the gray scales can be achieved by adding three oscillation modulation periods. And with an oscillation modulation representing ⅛ of the ON brightness, three bits of additional resolution of the gray scales can be achieved by adding seven oscillation modulation periods. Therefore, the present invention discloses an image display system enabled to achieve finer gray level by adding an oscillation modulation period for colors which need more gray level scales and longer display period as described previously.

Thus finer gray level of the particular colors is displayed by combining an oscillation modulation and ON/OFF modulation according to the dynamic control of the display periods for different colors.

(3) The color display device 100 according to present embodiment can change the color balance.

The color display device 100 according to the present embodiment can provide a flexibility for a user adjust desired color balance using the settings (red display period tR, green display period tG, blue display period tB, and white display period tW) of a predetermined ratio of the display period stored in the color switch timing setting memory 119*c* in the control unit 110.

(4) The color display device 100 according to the present embodiment allows the flexibility to externally change the settings of the color balance.

Furthermore, the color display device 100 according to the present embodiment has a flexibility to change the ratio of each display time of the red display period tR, the green display period tG, the blue display period tB, and the white display period tW based on the external communication data inputted through the communication interface 119*d* as a function of communications with external equipment.

(5) The color display device 100 according to the present embodiment can set white balance.

According to the present embodiment, the color image display system provides a flexibility to adjust the desired white color coordinates by adjusting the ratio among the red display period tR, the green display period tG, and the blue display period tB, or by a minimum change without converting the illumination light 300.

(6) The color display device 100 can improve both brightness and color reproducibility using one color display device 100.

In the conventional RGB color sequential display system, the white color is displayed by adding the data of RGB. In the projector device for generating color sequential illumination using a color wheel, a white (colorless) filter in addition to RGB filters is used to improve the brightness. In such systems, the color wheel is divided into at least four regions of R, G, B, and W.

In the picture display having a white region in addition to the RGB in the color wheel, the picture display is brighter than the picture display of a display device having only the RGB region. However, the technical challenge remains due to the degradation of the purity of the color of the brighter portion in the display screen.

A display system using only the RGB regions in a color wheel without the white region is challenged by a difficulty of a darker white color. For this reason, a white region is implemented to improve the color purity.

According to the present embodiment, the display time of the white light (colorless) is set as illustrated in FIG. 6 as necessary to improve the brightness of the display screen. On the other hand, when the color reproducibility becomes a more critical consideration, the illumination time is assigned only to the RGB (or RGB+CMY as necessary) and the illumination time of the white light is not assigned in the 1-frame display time. Using the displaying data without degradation in brightness on the display screen image display is dynamically controlled by.

Furthermore, the display screen can be totally darkened depending on the display environment or at a request of a user. This is achieved by setting the time in which no light is projected in the 1-frame display period. It is also possible to reduce the color artifact by equally assigning the time in which no light is projected in the 1-frame display period among a plurality of spatial light modulation elements.

The present invention is not limited to the configurations illustrated according to the above-mentioned embodiments, but it is obvious that various changes may be made utilizing the general techniques (?) of the present invention.

According to the present invention, a color display technique capable of improving the color balance and brightness of a display picture can be provided depending on the characteristics of the input picture data.

In addition, a color display technique capable of increasing the number of displayed gray-scale levels of each color can be provided depending on the characteristics of the input picture data.

Although the present invention has been described by exemplifying the presently preferred embodiments, it shall be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as falling within the true spirit and scope of the invention.

What is claimed is:

1. A color display device, comprising:
    an illumination device comprising a plurality of laser light sources or light emitting diode (LED) light sources for generating an illumination light of a plurality of different colors;
    at least one spatial light modulator modulates said illumination light for forming a display image; and
    a control device analyzes an input image data for determining a first and second primary colors contained in successive frames necessary for increasing and decreasing levels of gray scale respectively and the control device further includes a data converter for converting at least a portion of the input image data into non-binary data bits and assigning each data bit with an equal weight for controlling said spatial light modulator and said illumination device by applying said input image data with said non-binary data bits assigned with said equal weight and change, according to a set of more flexible non-binary ratios as analyzed by the control device, a light emission intensity of said first and second primary colors of said illumination light emitted from the illumination device to increase and decrease the levels of gray scale of said first and second primary colors respectively.

2. The color display device according to claim 1, wherein: said control device analyzes the input image data of a plurality of selected image display areas to change, according to the set of more flexible non-binary ratios as analyzed by the control device, the light emission intensity of said first and second primary colors of said illumination light emitted from the illumination device for the selected image display areas.

3. The color display device according to claim 1, wherein: said control device further controls a frame period of the color display device based on a flexibly adjustable frequency between 50Hz and 360 Hz.

4. he color display device according to claim 1, wherein: said control device further analyzes the input image data for determining a color balance requirement to control said illumination device to change, according to the set of more flexible non-binary ratios as analyzed by the control device, said illumination light emitted from said plurality of laser light sources or light emitting diode (LED) light sources.

5. The color display device according to claim 1, wherein: said control device further analyzes the input image data for determining a pulse emission requirement for each color to control, according to the set of more flexible non-binary ratios as analyzed by the control device, said light emission of different colors emitted from said laser light sources or light emitting diode (LED) light sources.

6. The color display device according to claim 1, wherein: said control device further analyzes the input image data for determining a cycle of pulse emission requirement for each color to control, according to the set of more flexible non-binary ratios as analyzed by the control device, said light emission of different colors from said laser light sources or light emitting diode (LED) light sources.

7. The color display device according to claim 1, wherein: said control device further analyzes and applies the input image data to control, according to the set of more flexible non-binary ratios as analyzed by the control device, said laser light sources or light emitting diode (LED) light sources to emit the illumination light of different color as pulsed emissions each with a controlled pulse width.

8. The color display device according to claim 1, wherein: said control device further comprises a frame memory for storing a plurality of successive frames of said input image data and continuously and periodically updates said input image data stored in said frame memory after a predetermined number of frames are projected.

9. The color display device according to claim 1, wherein: said control device generating a control signal to control said spatial light modulator wherein said control signal comprises a series of bits wherein at least some of the bits are the non-binary data bits each assigned with the equal weight to control, according to the set of more flexible non-binary ratios as analyzed by the control device, said spatial light modulator in each of color subframes within said frame period.

10. The color display device according to claim 1, wherein: said control device controls said illumination device to adjust said light emission intensity of said illumination light of said first and second primary colors corresponding to a change of said ratio of said display time constituting one of the set of more flexible non-binary ratios as analyzed by the control device and maintaining a same brightness of an image displayed by the color display device.

11. The color display device according to claim 1, wherein: said spatial light modulator comprising a plurality of micromirrors, and said control device control each of said micromirrors to operate in an ON state, and an OFF state.

12. The color display device according to claim 1, wherein: said spatial light modulator comprising a plurality of micromirrors, and said control device control each of said micromirrors to operate in an ON state, an OFF state and a partially-ON state; and
said control device generates a modulation control signal to change a combination of said ON state, said OFF state and said partially-ON state depending on said set of more flexible non-binary ratios as analyzed by the control device for controlling a display time of each color in said frame period.

13. A color display device, comprising:
an illumination device comprising a plurality of laser light sources or light emitting diode (LED) for generating an illumination light of a plurality of different colors;
at least one spatial light modulator forming a display image by a modulated light obtained by modulating an illumination light; and
a control device controlling said spatial light modulator and said illumination device based on an input image data, wherein the control device further includes a data converter for converting at least a portion of the input image data into non-binary data bits and assigning each data bit with an equal weight; and
said control device applying said input image data with said non-binary data bits assigned with said equal weight to control said spatial light modulator and said illumination device by applying said input image data with said non-binary data bits assigned with said equal weight to change, according to a set of more flexible non-binary ratios as analyzed by the control device, a display time of each color of said illumination light in a frame period by analyzing variation characteristics of multiple frames of said input image data, and controls a drive circuit of said illumination device to change, according to the set of more flexible non-binary ratios as analyzed by the control device, a light emission flux during a sub-frame for displaying a color emitted from the illumination device.

14. The color display device according to claim 13, wherein:
said control device further analyzes the input image data for determining a color balance requirement to control said illumination device to change, according to the set of more flexible non-binary ratios as analyzed by the control device, a modulation of at least two colors of said illumination light emitted from said plurality of light sources.

15. The color display device according to claim 13, wherein:
said control device further analyzes the input image data for determining a color balance requirement to control said illumination device to change, according to the set of more flexible non-binary ratios as analyzed by the control device, the light emission intensities of at least two colors of said illumination light emitted from said plurality of laser light sources or light emitting diode (LED).

16. The color display device according to claim 13, wherein:
said control device controls said spatial light modulator and said illumination device according to a set of more flexible non-binary ratios as analyzed by the control device to adjust a number of gray scale levels of a color light corresponding to said ratio of display time of each color within the display frame whereby each color is projected in a sub-frame having an adjustable number of gray scale levels adjustable to be different from another color displayed in another sub-frame within the display frame period.

* * * * *